No Printed Specification Available
8408X
J. L. St. John,
Water Wheel,
Patented Sept. 16, 1834.
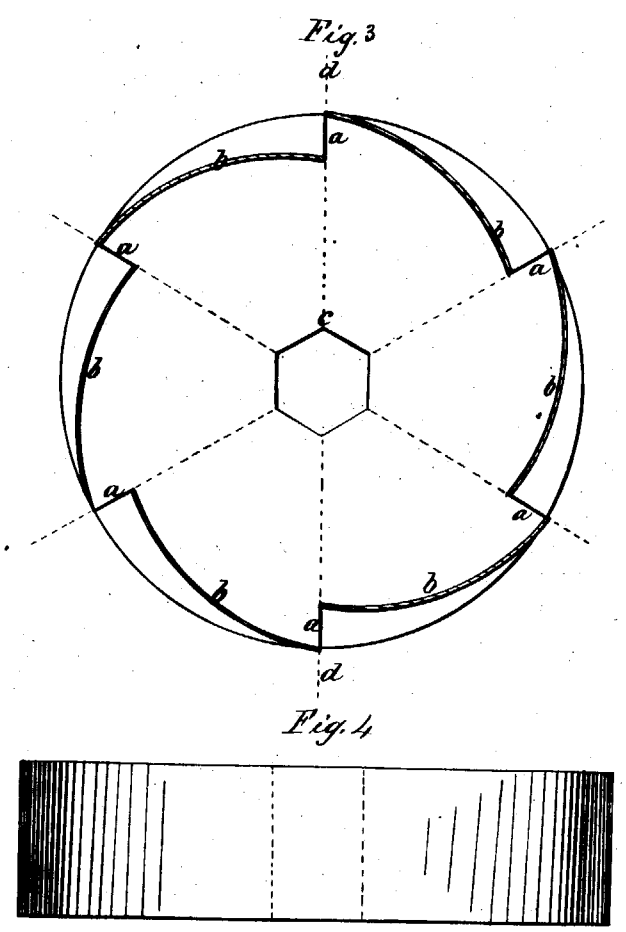
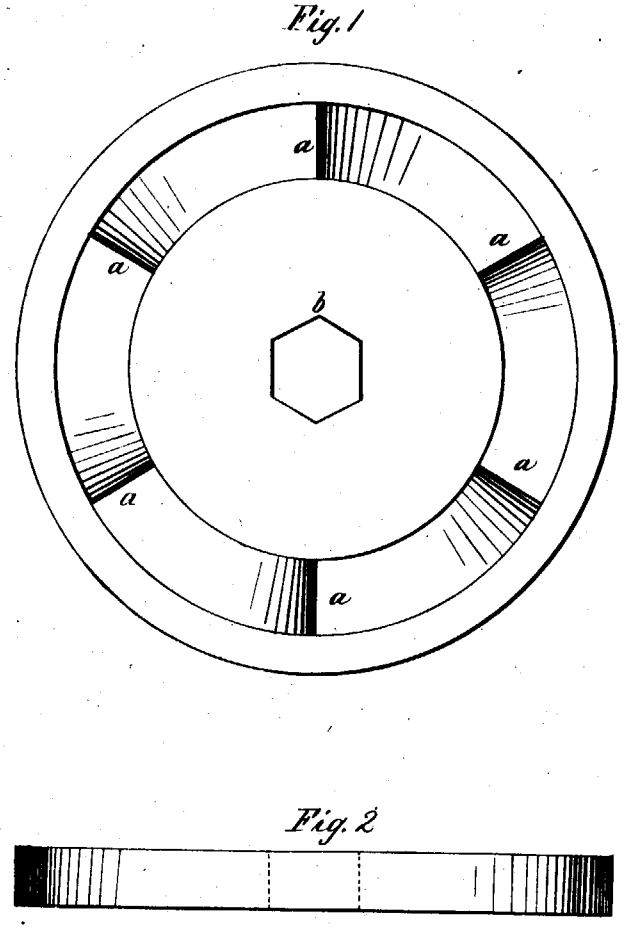
N. PETERS, PHOTO-LITHOGRAPHER, WASHINGTON, D. C.

8408X Sept. 16. 1834 55

John L. St John of Canajoharie New York

Letters Patent

The Schedule referred to in these Letters Patent and making part of the same, containing a description in the words of the said John L. St John himself of his improvement in reaction ... water wheels To all to whom these presents shall come, Be it known that I, John L. St John, of Canajoharie, in the County of Montgomery and State of New York have invented a new and useful improvement in Reaction water wheels, and wheels operating by the power of reaction I. By the invention of a new form or forms of wheels. II. By improvement on those already in use — and that the following is a full and exact description, of the construction and operation of the said Wheels and improvements as invented and improved by me.

I. The description of the construction and operation of the new form or forms of ~~the~~ wheels and the variations.

These wheels have openings at or near the verge or edge through which the water passes. and it is the passing of the water through these openings that creates the power of reaction by which the wheels operate. These openings or issues give direction to the water, at or near a right angle with the radii of the wheel drawn through them and with as little angle to the face of the wheel as possible. The number and form of these openings in a wheel is not material. The diameter of a wheel with the quantity of water discharged through it must vary to suit the fall of water and the power and the velocity required. The thickness of these wheels must be sufficient to form the issues, and be varied accordingly. although the diameter and thickness of these wheels, and the number and size of their issues must be varied, yet to explain the construction, I will describe the forming of one of 32. inches in diameter, 3 inches thick with 6 issues discharging 60 square inches of water. this is easiest done by taking as many pieces of 3 inch 8408x    Sept 16, 1834 plank and cut them so that each piece will form an equal part
of the verge of the wheel with a point in the centre. Then describe
on this wheel so formed, two concentric circles, the largest 28 inches in
diameter, the other 20 inches in diameter. Then take each piece and
cut down on two of the opposite corners, between the circles, deep enough so that
when the pieces are placed together. an opening will be formed 2½ inches
deep cut back between the circles so that the timber left will be only about
3/4 of an inch thick. This timber left may be called the buckets, and
the timber between them and the verge the rim and the timber between
the buckets the head. This wheel must then be banded or fastened
together, and an opening made in the centre, to receive the shaft or
the pieces may be fitted into a groove turned or cut into the shaft
and then banded. The inner corner of the [illegible] should be rounded
off so that the water can come to the place of issue freely. also the cor-
ners of the head and rim on the outside of the wheel should be rounded
or slided off. so that the water may be discharged freely.

The ends of the buckets, or timber left between the buckets, may
be taken off. so that a line drawn at right angles with the direction
of the water from the end of one of the buckets across the issue, will
be direct to the end of the other. The rim or timber at the verge may
all be taken off down to the buckets, or the wheel may be made without
a rim. or a wheel may be made in this form by first making the head
and then placing the buckets on the verge of it. then turning out the
outer edge of them after the wheel is hung on the shaft.
These wheels which have no rim must have a cylinder top or rim placed
around them, and as near to the outer edge of the buckets as it can
be without touching them. These wheels may be made of cast iron
by having a plate cast to suit in form, one side of the wheel. In
some situations, wheels will do best if they are so constructed that
the water discharges out through the edge that is so that when
the wheel is placed on an upright shaft the water discharges horizontally.
To form one make a head of 28 inches in diameter, then describe a
circle of 23. inches on it. Then draw as many radiating lines from 8408x Sept 16, 1834 [illegible]

the centre to the verge with equal distances, as you want issues. Then draw a curving line from each radiating line at the verge to another at the circle. Then cut off the head down to the curving lines. Then fasten the buckets on the curving lines which may be made of cast iron, or sheet iron and so that they will project about 5½ inches above the head, have them long enough to reach from one radiating line to another. then form a rim 32 inches in diameter 1½ inch thick. Then cut the inner edge to suit the form and size of the outside of the buckets. then fasten this rim on the buckets so that the top of the rim will be even with the top of the buckets. the form and size of these may be varied. This wheel should be filled up in the centre around the shaft level with the rim and slanted off down to an edge, at the inner end of the buckets. If a spout is used, the filling up should be carried out level far enough for the spout to be fitted against. These wheels may also be made of cast iron, by having a plate cast to suit the form of the inward and face side of the wheel, with or without the filling up around the shaft. Wheels may be made different from any of the forms above described. by having the water discharged partly at the side and partly at the edge. and the form of the issues may be varied they may be round, elliptical, oblong, or square, or the inner face corner may be rounded and the outward back corner also, the form of the issues is not material if a proper quantity is discharged. the size of the issues may be made so as to lap by each other, but if they do the motion and power will be diminished in proportion to the ~~distance~~ of the lapping — II. The improvements of those already in use.

First, this improvement consists in using less lapping by, of the ends of the bucket than has been heretofore used.

Second in having less lapping by the sides of the issues than has been heretofore used. Third in making or altering the wheels so that the water will not be pressed by the the wheel neither before it comes to the place of issue nor after it passes it, and only at a single line in the issue. Fourth, in so forming and altering the wheel that the water can come to the issue, free and direct and pass through it without friction and be discharged without obstruction. The common reaction water wheels
now in use, have a head or main part which is fixed to the shaft,
on this head the buckets so called are placed and covered with a
rim. The water passes through the rim, into the wheel, and be-
tween the buckets, out of the wheel. The ends of the buckets lap
by each other, more or less. These wheels may be improved in the
following way. First, by cutting off the inner or head ends of the
buckets. Second, by cutting off the inner edge of the rim. Third, by
cutting off the outer edge of the head. Fourth, by filling up the wheel
in the centre. Each of these I consider as separate improvements, and
are done in the following manner. — First, to cut off the buckets,
draw converging lines from the point or outer end of each bucket to
the centre of the wheel, then cut off the head or inner ends of the
buckets so that they shall not pass these lines, and so that the
sum of all their lengths will not be quite equal to the circumfer
ence of the wheel. Second to cut off the rim, cut off all that
projects in beyond the inside, of the buckets even with the buckets,
in form with [illegible] buckets
and at the place of issue follow the converging line from one bucket
to the other and then if the rim is not sufficient in width, add
to it in the outer edge, an additional rim can be fixed on it so that
the inner edge will be even with the points of the buckets, and turn-
ed off true on the inner edge for the spout cylinder or staving to be
fitted against. Third. to cut off the head, cut off all that pro-
jects beyond the outside of the buckets Fourth to fill up the wheel in
the centre take blocks, and fit them round the shaft, and even with
the top of the rim, and slanting off, down to an edge at the inner
ends of the buckets. this filling up may be carried out level far enough
for the inner edge of a spout to be fitted against when it is used
The advantages of the several improvements are.
First. the cutting off of the buckets allows the water to pass the
issue without friction. Second. the cutting off of the rim allows
the water to come direct and free to the issue. Third the cutting
off of the heads allows the water to escape without obstruction, Fourth.

[illegible] 8408X Sept 16, 1834 the filling up of the wheel prevents any water lying dead in the wheel and directs the water to the issue and forms a surface for the spout to be fitted against. Some wheels are so formed that one edge of the buckets is placed towards the centre of the wheel, and so that when a wheel is placed on a perpendicular shaft, the water will be discharged upward or downward. To improve these wheels draw a line from the point or outer end of each bucket parallel with the shaft. then cut off all the heads or inner ends of the buckets. so that they shall not pass any of these lines. Then cut off all the tub or rim that projects below or beyond the outside of the buckets and in form to suit the buckets. This allows the water to pass the space without friction and be discharged freely. All other forms of wheels may be improved by altering them agreeable to the above principles and Rules explained. All the above forms of wheels, whether new or improved may be used in any way, manner, or situation that wheels operating by the power of reaction are now used.

The parts of the above described wheels and improvements claimed original and as my invention, and for which I ask an exclusive privilege are. I. The new former forms of wheels as described in the first part. II. The improvements as explained, and the various improvements as described in the second part.

Witnesses
Willis J. Powell
Baront Galsbury

John L. St. John [illegible]

Drawing (2114 Words)

(Granted 16th September 1834)